United States Patent
Ohms et al.

(10) Patent No.: US 8,746,065 B2
(45) Date of Patent: Jun. 10, 2014

(54) ROTATIONAL RATE SENSOR HAVING INTERMESHING CORIOLIS ELEMENTS

(75) Inventors: Torsten Ohms, Vaihingen/Enz-Aurich (DE); Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 13/293,874

(22) Filed: Nov. 10, 2011

(65) Prior Publication Data

US 2012/0125098 A1 May 24, 2012

(30) Foreign Application Priority Data

Nov. 23, 2010 (DE) .......................... 10 2010 061 759

(51) Int. Cl.
*G01C 19/56* (2012.01)
(52) U.S. Cl.
USPC .......................................................... 73/504.12

(58) Field of Classification Search
USPC ...................................................... 73/504.12
See application file for complete search history.

(56) References Cited

FOREIGN PATENT DOCUMENTS

DE 101 08 196 10/2002

*Primary Examiner* — Hezron E Williams
*Assistant Examiner* — Gregory J Redmann
(74) *Attorney, Agent, or Firm* — Kenyon & Kenyon LLP

(57) ABSTRACT

A rotational rate sensor includes: a substrate having a main plane of extension; a first Coriolis element; and a second Coriolis element. The first Coriolis element and the second Coriolis element have a first and a second center of gravity, respectively, and the elements are drivable along a drive direction. In the idle state of the rotational rate sensor, (i) the distance between the first center of gravity and the second center of gravity along the detection direction is less than a first value, and (ii) the distance between the first center of gravity and the second center of gravity along the third direction is less than a second value.

10 Claims, 8 Drawing Sheets

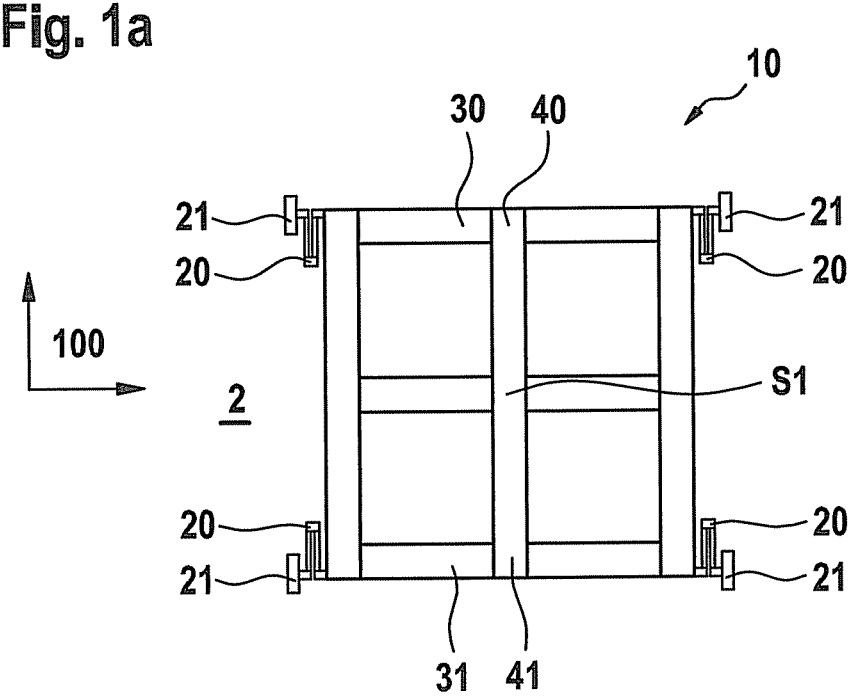
Fig. 1a
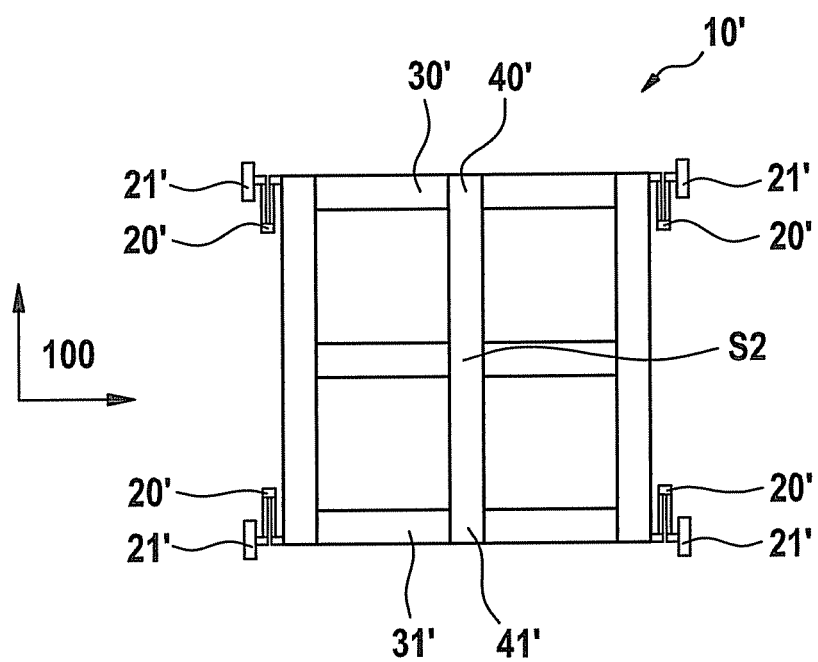

ROTATIONAL RATE SENSOR HAVING INTERMESHING CORIOLIS ELEMENTS

BACKGROUND OF THE INVENTION

1. Field of the Invention

The present invention relates to a rotational rate sensor having intermeshing Coriolis elements.

2. Description of the Related Art

Such rotational rate sensors are generally known. For example, published German patent application document DE 101 08 196 A1 discloses a rotational rate sensor having a first and a second Coriolis element, the first Coriolis element being connected to the second Coriolis element via a coupling element, and the first and the second Coriolis element being driven to vibration along a first direction (referred to in the following as excitation mode or drive vibration), a Coriolis force causing a deflection of the first and second Coriolis element perpendicular to the first direction (referred to in the following as detection mode or detection vibration), the deflection being measurable by a detecting means, in particular an electrode system. Using the rotational rate sensor, in this way a rotational rate acting perpendicular to the first direction can be determined. The above-named publication further discloses that the first and the second Coriolis element are preferably driven to out-of-phase vibration along the first direction, a rotational rate acting perpendicular to the first direction resulting in an opposed deflection between the first and second Coriolis element, so that a differential determination of the rotational rate is enabled, and thus a comparatively good signal-to-noise ratio is achievable. However, a disadvantage of known rotational rate sensors is their relatively high installation space requirement and their comparatively high sensitivity to rotational accelerations, which are expressed as disturbing movement and are superposed on the detection mode so that the rotational rate measurement is falsified.

BRIEF SUMMARY OF THE INVENTION

In contrast, the rotational rate sensor according to the present invention has the advantage that in the resting state of the rotational rate sensor the centers of gravity of the first Coriolis element and of the second Coriolis element approximately coincide, so that the rotational rate sensor according to the present invention can be realized with a particularly compact construction, thus enabling simplified integration of the rotational rate sensor according to the present invention. If in addition the rotational rate sensor according to the present invention is operated such that the first and second Coriolis elements are driven to drive vibrations along the drive direction that are out of phase with one another, so that when a Coriolis force acts the first and second Coriolis element are deflected opposite one another along the detection direction, then a person skilled in the art will understand that, given a small distance between the centers of gravity of the first and second Coriolis elements along the drive direction and/or the detection direction, disturbing modes, in particular due to rotational accelerations, will advantageously be suppressed, so that rotational rate measurements having particularly high precision are enabled. In the sense of the present invention, the Coriolis element can be fashioned as a linear vibrator and/or as a rotational vibrator. A person skilled in the art will know that in the case of a rotational vibrator the drive direction and detection direction are defined by the axis of rotation and the sense of rotation of the rotational drive vibration or detection vibration. The rotational rate sensor according to the present invention is preferably fashioned as a $\Omega_x$ sensor, i.e. for the measurement of a rotational rate acting parallel to the main plane of extension, the rotational rate being detected through a resultant deflection, perpendicular to the main plane of extension, of the first and second Coriolis element. However, it is also possible for the rotational rate sensor according to the present invention to be fashioned as a $\Omega_z$ sensor, i.e. for the measurement of a rotational rate acting perpendicular to the main plane of extension, the rotational rate being detected through a resultant deflection, parallel to the main plane of extension, of the first and second Coriolis element. In addition, the rotational rate sensor according to the present invention can also be realized simultaneously as a $\Omega_x$ sensor and as a $\Omega_z$ sensor, enabling a particularly flexible use of the rotational rate sensor according to the present invention. In addition, the rotational rate sensor according to the present invention can be realized with comparatively simple and economical means, for example using a standard micromechanical manufacturing method, the substrate preferably including a semiconductor substrate.

According to a preferred specific embodiment, it is provided that in the idle state of the rotational rate sensor, the distance between the first center of gravity and the second center of gravity along the drive direction is less than 10%, preferably less than 5%, and particularly preferably less than 1% of the first extension and of the third extension, and/or that in the idle state of the rotational rate sensor the distance between the first center of gravity and the second center of gravity along the detection direction is less than 10%, preferably less than 5%, and particularly preferably less than 1% of the second extension and of the fourth extension. If the first and second centers of gravity essentially coincide completely, then, particularly advantageously, almost no disturbing movements are excited by the action of rotational accelerations. According to the present invention, such a rotational rate sensor can for example be realized comparatively simply through local variations of the material density of the first and of the second Coriolis element, in the context of a standard micromechanical manufacturing method.

In addition, according to the present invention it is preferred that the first Coriolis element has a first lattice structure, the second Coriolis element having a second lattice structure, the first lattice structure and the second lattice structure being configured so as to mesh with one another, the first lattice structure and the second lattice structure particularly preferably being interleaved with one another. In this context, "interleaved" means that there is at least a partial overlap between a projection of the first lattice structure along a direction of projection that runs perpendicular to the main plane of extension and a projection of the second lattice structure along the direction of projection running perpendicular to the main plane of extension. In this way, according to the present invention it is advantageously possible for the first and the second Coriolis elements to be interleaved with one another in such a way that a rotational rate sensor can be realized that is particularly compact with regard to installation space, and the distance between the first center of gravity and the second center of gravity can be kept particularly small.

According to the present invention, it is further preferred that the first Coriolis element and/or the second Coriolis element each have a layer construction, the layer construction including a functional plane and at least one second functional plane, the first functional plane and the second functional plane extending essentially parallel to the main plane of extension and being situated one over the other along a direction running perpendicular to the main direction of extension.

According to the present invention, it is particularly preferable for the first functional plane to have a partial lattice structure having first webs situated parallel to a first partial lattice direction, the second functional plane having a second partial lattice structure having second webs situated parallel to a second partial lattice direction, the second partial lattice direction quite particularly preferably running perpendicular to the first partial lattice direction. In this way, according to the present invention it is advantageously possible to realize a mechanically stable lattice structure of the first and/or second Coriolis element with comparatively low manufacturing outlay, and to enable an interleaved configuration between the first and the second Coriolis element.

According to the present invention, it is additionally particularly preferred that the layer construction have a third functional plane, the third functional plane extending essentially parallel to the main plane of extension and being situated over the second functional plane along the direction running perpendicular to the main direction of extension, the third functional plane particularly preferably having a third partial lattice structure having third webs situated parallel to a third partial lattice direction, the third partial lattice direction quite particularly preferably running perpendicular to the second partial lattice direction. In this way, according to the present invention it is advantageously possible to realize the first and/or second Coriolis element to be particularly robust, and to increase the rigidity of the first and/or second Coriolis element against bending perpendicular to the main plane of extension. In addition, according to the present invention it is possible, using coupling elements attached to the third functional plane between the first and second Coriolis element, to shift an in-phase disturbing vibration between the first Coriolis element and the second Coriolis element, running perpendicular to the main plane of extension, toward higher frequencies. This enables an advantageous suppression of disturbing modes.

In addition, according to a preferred specific embodiment it is provided that the first Coriolis element and the second Coriolis element are essentially identical in construction. In the sense of the present invention, "essentially identical in construction" means that through spatial transformation, i.e. translation and/or rotation and/or mirroring, the first Coriolis element can be brought to coincide with the second Coriolis element in such a way that a projection of the transformed first Coriolis element along a direction of projection running perpendicular to the main plane of extension forms a first projection surface, and that a projection of the second Coriolis element along the direction of projection running perpendicular to the main plane of extension forms a second projection surface, the first and second projection surfaces forming a surface overlap that is preferably more than 70% of the overall projection surface made up of the first and second projection surface, particularly preferably more than 90% of the overall projection surface, and quite particularly preferably more than 95% of the overall projection surface. Advantageously, in this way a high degree of symmetry is realized of the rotational rate sensor according to the present invention, so that a highly precise measurement of a rate of rotation can be achieved.

In addition, according to the present invention it is preferred that the first Coriolis element be capable of being driven to a first drive vibration along the drive direction, the second Coriolis element being capable of being driven to a second drive vibration along the drive direction, the first drive vibration preferably being out of phase with the second drive vibration. Advantageously, in this way a Coriolis force causes an opposed deflection between the first and the second Coriolis element along the direction of detection, so that a differential, and thus particularly disturbance-resistant, evaluation of a rotational rate measurement can be achieved.

In addition, according to the present invention it is preferred that the first and the second Coriolis element be connected to one another by coupling elements, the coupling elements preferably having a rocker structure, the coupling elements preferably being anchored to the substrate by anchoring springs, the anchoring springs particularly preferably including flexible springs or torsion springs. According to the present invention, it is advantageously possible to fashion the rocker structure such that in-phase detection vibrations of the first and second Coriolis element are suppressed or shifted to higher frequencies, out-of-phase detection vibrations of the first and second Coriolis element being influenced only to a small degree or substantially not at all. In this way, it is advantageously possible to significantly suppress disturbing modes that cause an in-phase vibration of the first and second Coriolis element, or to easily separate them from the detection modes, so that the rotational rate sensor according to the present invention can achieve a high degree of measurement precision.

According to the present invention, it is further preferred that the first Coriolis element have a first drive frame and a first detection element, the first detection element being connected to the first drive frame by first spring elements, and/or that the second Coriolis element have a second drive frame and a second detection element, the second detection element being connected to the second drive frame by second spring elements.

In addition, according to the present invention it is particularly preferable that the first and/or second spring elements be made soft along the drive direction and rigid along the detection direction. In this way, it is advantageously possible for the first detection element essentially to execute only a first detection vibration, caused by a Coriolis force, along the detection direction, and/or for the second detection element to execute essentially only a second detection vibration, caused by the Coriolis force, along the detection direction, so that drive vibrations and detection vibrations are essentially advantageously capable of being decoupled from one another. In this way, it is advantageously possible for the rotational rate sensor to perform measurements that are particularly resistant to disturbing movements in the drive direction.

In addition, according to the present invention it is preferred that the rotational rate sensor have a first detection means for measuring the first deflection and/or a second detection means for measuring the second deflection, the first and/or second detection means preferably being fashioned as electrode systems that are stationary relative to the substrate, the electrode system preferably forming a first electrical capacitance with the first Coriolis element, and/or the electrode system preferably forming a second electrical capacitance with the second Coriolis element. In this way, according to the present invention it is advantageously possible to measure the first deflection via a change in the first electrical capacitance and/or to measure the second deflection via a change in the second electrical capacitance. Preferably, the electrode system is fashioned as a finger electrode structure and is configured so as to intermesh with the first and/or second lattice structure. In this way, it is possible according to the present invention to integrate the first and/or the second detection means into the rotational rate sensor according to the present invention in such a way that a particularly compact rotational rate sensor can be realized.

According to the present invention, it is further preferred that the first Coriolis element and the second Coriolis element be galvanically separate from one another, the first Coriolis element and the second Coriolis element forming an electrical capacitance. In this way, it is possible according to the present invention for a relative deflection between the first and the second Coriolis element to be capable of being determined via a change in the electrical capacitance, the relative deflection being a measure of an acting rotational rate. Advantageously, in this way it is possible for the first and second Coriolis element to act simultaneously as a detection means, so that an additional detection means, for example an electrode system, can be omitted, so that the rotational rate sensor according to the present invention can be manufactured particularly economically and compactly.

BRIEF DESCRIPTION OF THE DRAWINGS

FIGS. 1a and 1b show a schematic view of a first and of a second Coriolis element of the rotational rate sensor according to the present invention in a configuration separate from one another and in an interleaved configuration according to a first specific embodiment of the present invention.

DETAILED DESCRIPTION OF THE INVENTION

Figure 1B:
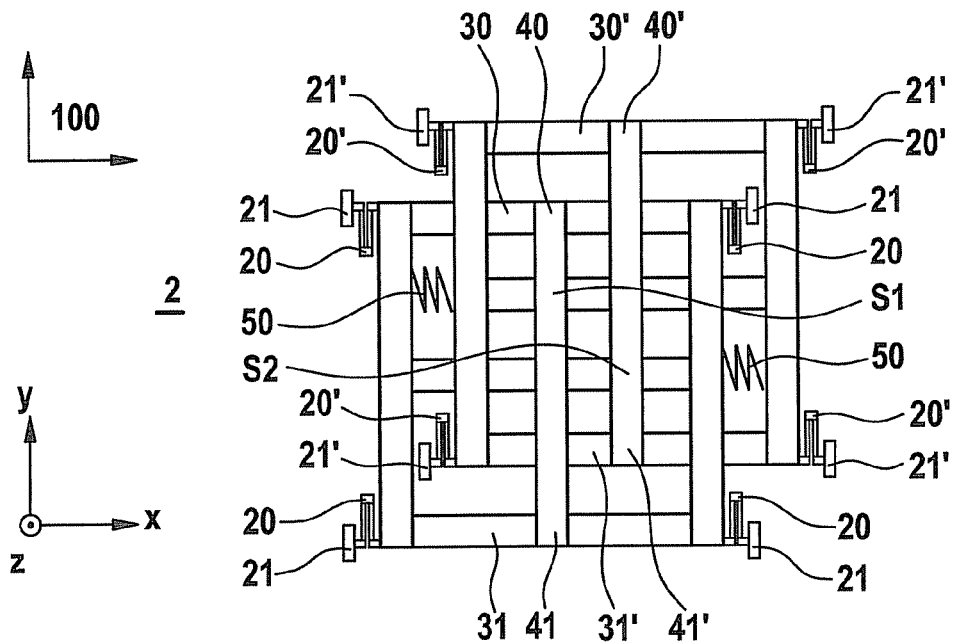

In the Figures, identical parts are provided with the same reference characters, and are therefore as a rule each named or mentioned only once.

FIG. 1a shows a schematic view of a first Coriolis element 10 and of a second Coriolis element 10', first Coriolis element 10 and second Coriolis element 10' being situated above a substrate 2 having a main plane of extension 100, first Coriolis element 10 having a first center of gravity S1 and second Coriolis element 10' having a second center of gravity S2. First Coriolis element 10 has a first layer construction, the first layer construction having a first functional plane 30 that extends essentially parallel to main plane of extension 100 and having a second functional plane 40 that extends essentially parallel to main plane of extension 100, second functional plane 40 being situated over first functional plane 30 along a direction running perpendicular to main plane of extension 100. First functional plane 30 has a first partial lattice structure having first webs 31 situated essentially parallel to a first partial lattice direction, second functional plane 40 having a second partial lattice structure having second webs 41 situated essentially parallel to a second partial lattice direction, the first partial lattice direction running perpendicular to the second partial lattice direction. The first partial lattice structure and the second partial lattice structure together form a first lattice structure of first Coriolis element 10. First Coriolis element 10 is in addition suspended on substrate 2 by first suspension springs 20 and first anchoring elements 21, first suspension springs 20 preferably being fashioned as U-springs. Analogously, second Coriolis element 10' has a second layer construction having a third functional plane 30' that extends essentially parallel to main plane of extension 100 and having a fourth functional plane 40' that extends essentially parallel to the main plane of extension 100, fourth functional plane 40' being situated over third functional plane 30' along a direction that runs perpendicular to main plane of extension 100. In addition, third functional plane 30' has a third partial lattice structure having third webs 31' situated essentially parallel to a third partial lattice direction, fourth functional plane 40' having a fourth partial lattice structure having fourth webs 41' situated essentially parallel to a fourth partial lattice direction, the third partial lattice direction running essentially perpendicular to the fourth partial lattice direction, so that the third partial lattice structure and the fourth partial lattice structure form a second lattice structure of second Coriolis element 10'. In addition, second Coriolis element 10' is anchored on substrate 2 by second suspension springs 20' and second anchoring elements 21', second suspension springs 20' preferably being fashioned as U-springs. According to the present specific embodiment of first and second Coriolis elements 10, 10', the first and the second Coriolis element 10, 10' are essentially identical in their construction.

FIG. 1b shows a schematic view of first and second Coriolis element 10, 10', first and second Coriolis element 10, 10' being interleaved with one another, and first and second Coriolis element 10, 10' further being coupled to one another via coupling elements 50. Due to the interleaved configuration of first and second Coriolis element 10, 10', rotational rate sensor 1 according to the present invention can be realized particularly compactly with regard to installation space, and in addition first and second center of gravity S1, S2 have an advantageously small distance from one another, so that rotational rate sensor 1 according to the present invention is comparatively insensitive to rotational accelerations. A person skilled in the art will know that in the manufacturing process of rotational rate sensor 1 according to the present invention, the distance between the first and second center of gravity S1, S2 can be minimized comparatively simply through local variation of the material densities (e.g. the degree of perforation) of first and second Coriolis element 10, 10'.

Figure 2:
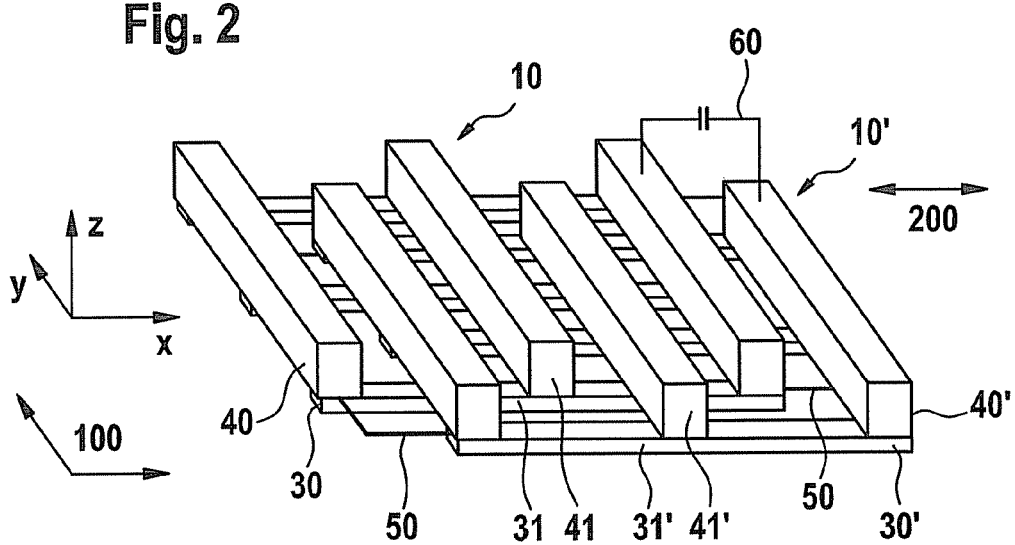
FIG. 2 shows a perspective representation of a first and of a second Coriolis element in an interleaved configuration according to the first specific embodiment of the present invention.

FIG. 2 shows a perspective representation of first and second Coriolis element 10, 10' according to the first specific embodiment of the present invention, in which, similar to FIG. 1b, first and second Coriolis element 10, 10' are interleaved with one another. According to the present invention, it is preferred that first and second Coriolis element 10, 10' be galvanically separated from one another, second webs 41 acting as electrodes and fourth webs 41' acting as counter-electrodes, so that second webs 41 and fourth webs 41' form an electrical capacitance 60. In this way, according to the present invention it is advantageously possible to measure a relative deflection along a direction of detection 200 between first and second Coriolis element 10, 10' via a change in electrical capacitance 60.

Figure 3:
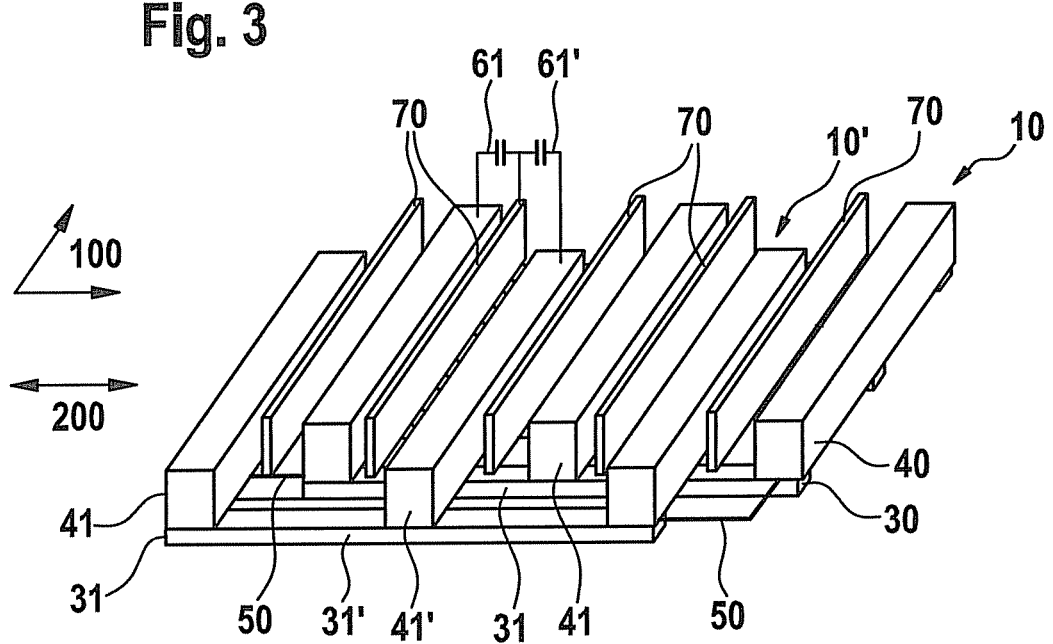
FIG. 3 shows a perspective representation of a first and of a second Coriolis element in an interleaved configuration according to a second specific embodiment of the present invention.

FIG. 3 shows a perspective representation of first and second Coriolis element 10, 10' according to a second specific embodiment of the present invention, the second specific embodiment resembling the first specific embodiment, first and second Coriolis elements 10, 10' being interleaved with one another, and the second specific embodiment providing an electrode system made up of counterelectrodes 70 that are stationary relative to substrate 2, counter electrodes 70 preferably being fixedly anchored on substrate 2. The electrode system is fashioned as a finger electrode structure and, for meshing with the first lattice structure of first Coriolis element 10 and the second lattice structure of second Coriolis element 10', is configured in such a way that second webs 41 form a first electrical capacitance 61 with counterelectrodes 70, and fourth webs 41' form a second electrical capacitance 61' with counterelectrodes 70. In this way, according to the present invention it is advantageously possible for a first deflection of first Coriolis element 10 along detection direction 200 to be capable of being determined via a change in first electrical capacitance 61, while a second deflection of second Coriolis element 10' along detection direction 200 is capable of being determined via a change in second electrical capacitance 61'.

Figure 4:
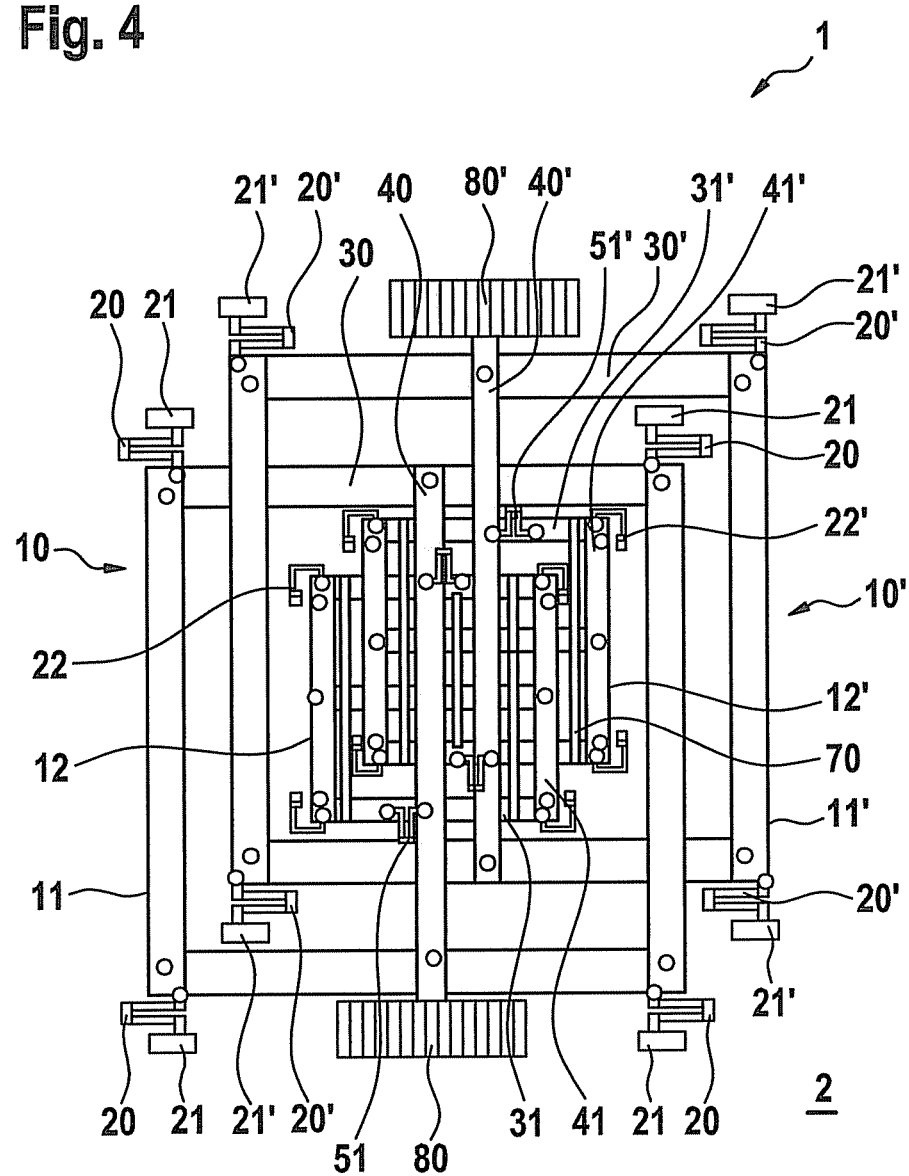
FIG. 4 shows a schematic view of a rotational rate sensor according to a third specific embodiment of the present invention.

FIG. 4 shows a schematic view of a rotational rate sensor 1 according to a third specific embodiment of the present invention, the third specific embodiment being similar to the second specific embodiment, first Coriolis element 10 having a first drive frame 11, a first detection element 12, and a first drive element 80, first drive frame 11 being anchored on substrate 2 by first suspension springs 20 and first anchoring elements 21, first detection element 12 being anchored on substrate 2 by first attachment springs 22, first drive element 80 being connected in mechanically rigid fashion to first drive frame 11 in a drive direction 300, first drive element 80 in addition being connected to first detection element 12 via first drive springs 51. First drive means 80 preferably has a plate capacitor drive having a finger structure (so-called interdigital structure) and drives first Coriolis element 10 to a first drive vibration along drive direction 300. Analogously, second Coriolis element 10' has a second drive frame 11', a second detection element 12', and a second drive element 80', second drive frame 11' being anchored on substrate 2 by second suspension springs 20' and second anchoring elements 21', second detection element 12' being anchored on substrate 2 by second attachment springs 22', second drive element 80' being connected mechanically fixedly in drive direction 300 to second drive frame 11', second drive element 80' in addition being connected via second drive springs 51' to second detection element 12', and second drive element 80' driving second Coriolis element 10' to a second drive vibration along drive direction 300. In addition, first Coriolis element 10 is connected to second Coriolis element 10' via coupling elements 50 (not shown). First and second suspension springs 20, 20' are preferably made soft along drive direction 300 and rigid along a detection direction 200 that runs perpendicular to drive direction 300, so that first and second drive frame 11, 11' are essentially movable only along drive direction 300. In addition, according to the present invention it is preferred that first and second drive springs 51, 51' be made rigid along drive direction 300 and soft along detection direction 200, so that first and second detection element 12, 12' are movable both along drive direction 300 and along detection direction 200. According to the depicted third specific embodiment, rotational rate sensor 1 is for example fashioned as a $\Omega_z$ sensor, so that detection direction 200 runs parallel to main plane of extension 100. A rotational rate acting perpendicular to main plane of extension 100 accordingly exerts a Coriolis force such that first and second detection element 12, 12' are deflected along detection direction 200 running parallel to main plane of extension 100, the deflection of first and second detection element 12, 12' being capable of being determined by counterelectrodes 70 via a change in first and second electrical capacitance 61, 61'. According to the present invention, it is preferred that the first drive vibration be out of phase with the second drive vibration. Advantageously, in this way the first and second deflection, caused by the Coriolis force, along detection direction 200 are opposed to one another, thus enabling a differential and thus particularly disturbance-resistant measurement on the part of rotational rate sensor 1 according to the present invention. A person skilled in the art will understand that rotational rate sensor 1 can also be fashioned as a $\Omega_x$ sensor.

Figure 5:
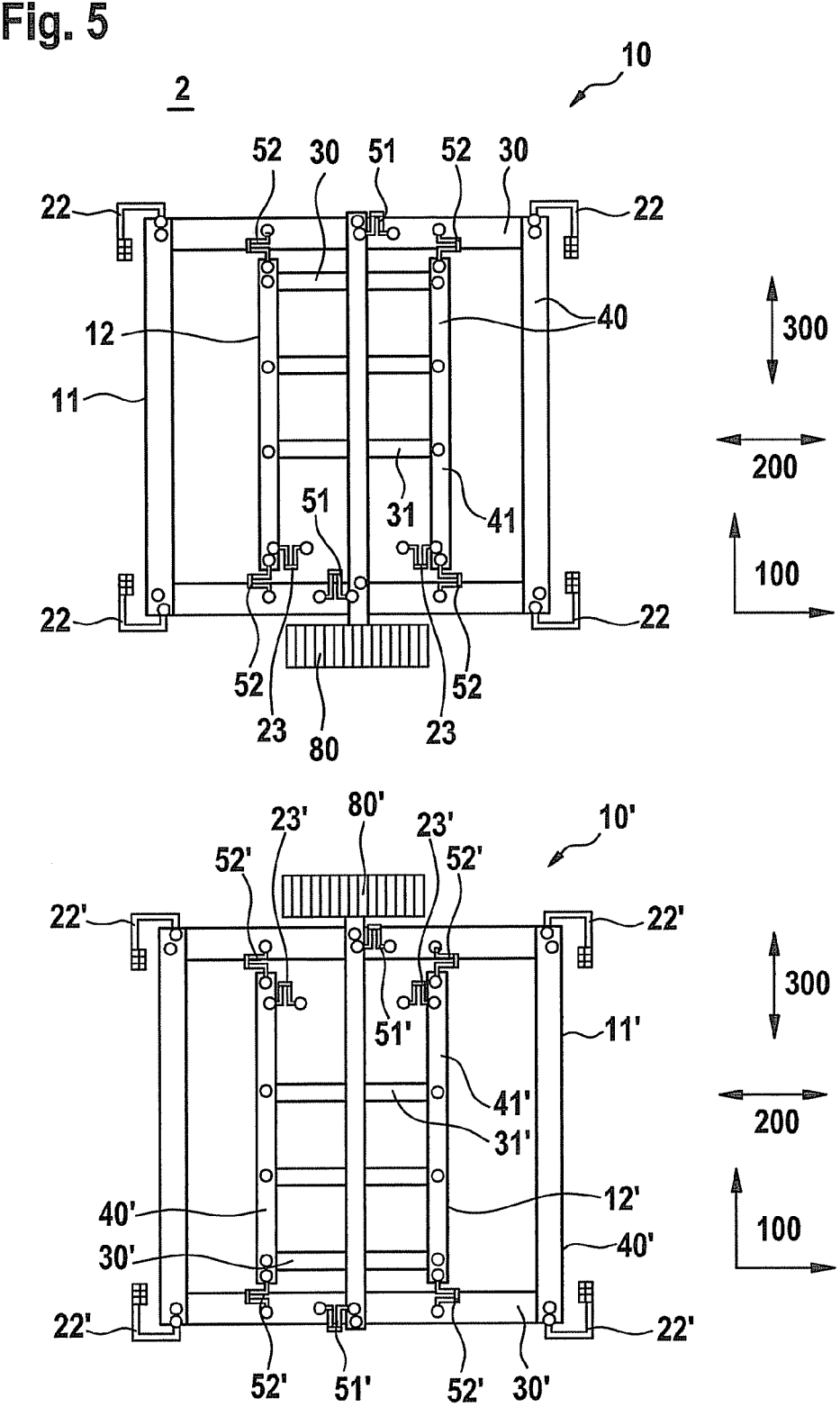
FIG. 5 shows a schematic view of a first and of a second Coriolis element in a configuration separate from one another according to a fourth specific embodiment of the present invention.

FIG. 5 shows a schematic view of a first and second Coriolis element 10, 10' in a separated configuration according to a fourth specific embodiment of the present invention, the fourth specific embodiment essentially resembling the third specific embodiment; in contrast to the third specific embodiment, however, first and second detection element 12, 12'. are anchored to substrate 2 via first and second supporting springs 23, 23', and are suspended on first and second drive frame 11, 11' via first and second spring elements 52, 52'. In addition, according to the fourth specific embodiment first and second drive element 80, 80' are fastened to first and second drive frame 11, 11' only via first and second drive springs 51, 51'. Preferably, first and second drive springs 51, 51' are fashioned so as to be rigid along drive direction 300 and soft along detection direction 200, so that first and second drive frames 11, 11' are movable both along drive direction 300 and along detection direction 200. In addition, first and second support springs 23, 23' are made rigid along drive direction 300 and soft along detection direction 200, first and second spring elements 52, 52' preferably being made rigid along detection direction 200 and soft along drive direction 300, so that first and second detection element 12, 12' essentially execute only a first and second detection vibration along detection direction 200, but do not execute a first and second drive vibration along drive direction 300. Advantageously, in this way it is possible to decouple the first and second drive vibration from the first and second detection vibration, so that disturbing modes can be significantly reduced.

Figure 6:
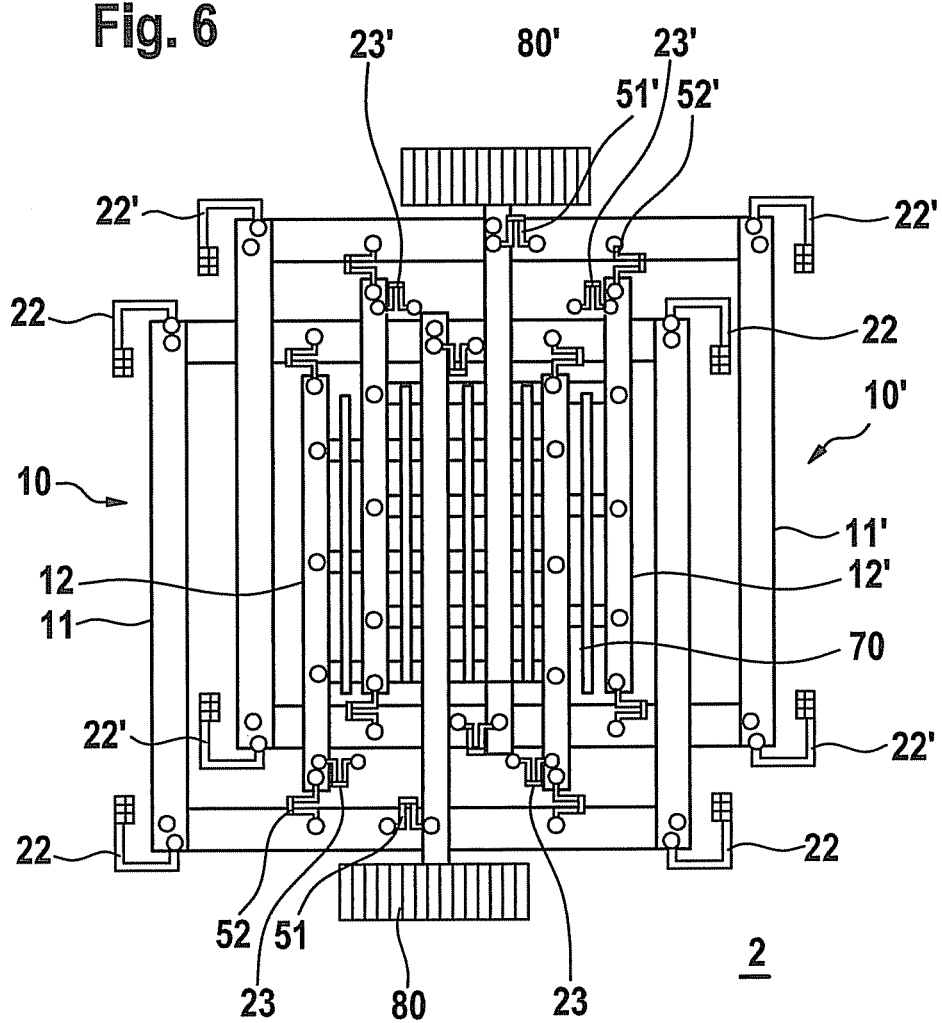
FIG. 6 shows a schematic view of a rotational rate sensor according to a fifth specific embodiment of the present invention.

FIG. 6 shows a schematic view of a rotational rate sensor 1 according to a fifth specific embodiment of the present invention, in which first and second Coriolis element 10, 10' of the fourth specific embodiment, described in FIG. 5, are interleaved with one another, first and second Coriolis element 10, 10' being coupled to one another via coupling elements 50 (not shown), a first and second deflection of first and second detection element 12, 12' along detection direction 200 being capable of being determined using counterelectrodes 70.

Figure 7:
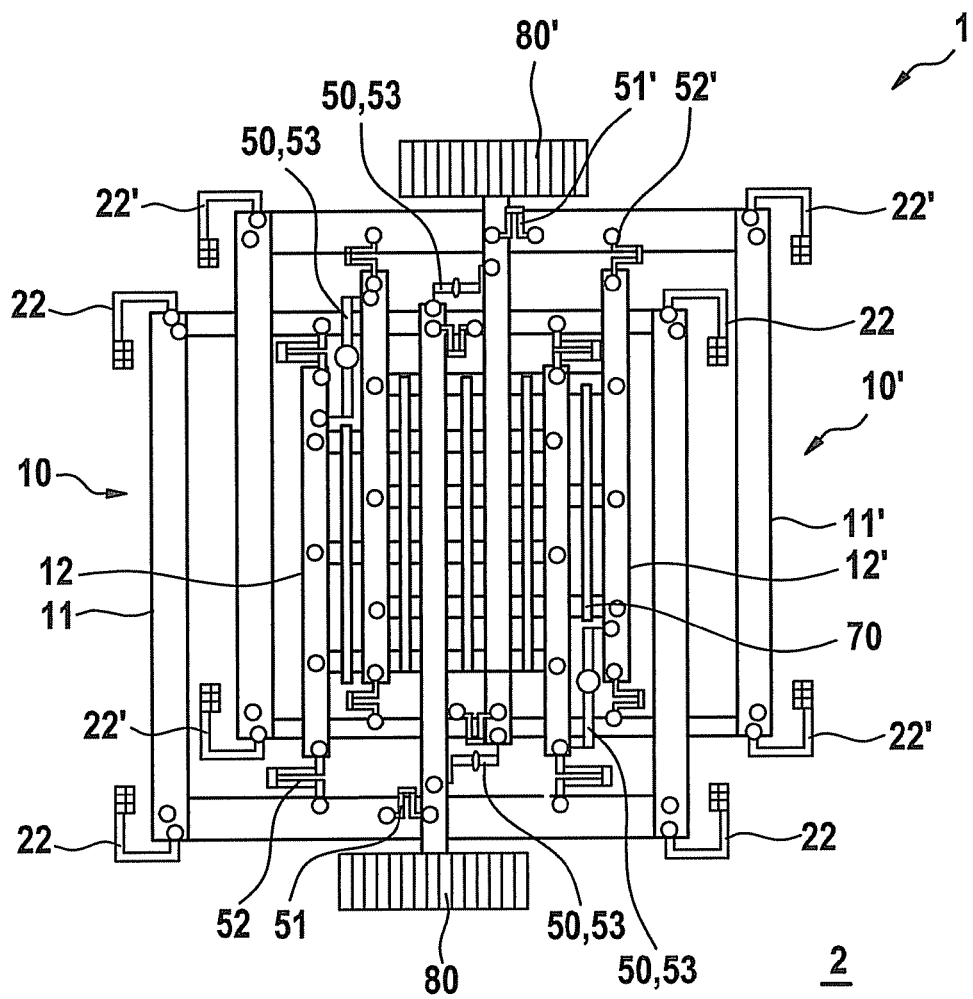
FIG. 7 shows a schematic view of a rotational rate sensor according to a sixth specific embodiment of the present invention.

FIG. 7 shows a schematic view of a rotational rate sensor 1 according to a fixed specific embodiment of the present invention, the sixth specific embodiment being similar to the fifth specific embodiment, coupling elements 50 having a rocker structure 53, coupling elements 50 preferably being anchored on substrate 2 via anchoring springs, the anchoring springs preferably including flexible springs or torsion springs. Rocker structure 53 is preferably fashioned such that in-phase vibrations between first and second Coriolis element 10, 10' along detection direction 200 are suppressed or are shifted to higher frequencies, out-of-phase vibrations between first and second Coriolis element 10, 10' along detection direction 200 being influenced only to a small extent or essentially not influenced. According to the present invention, in this way disturbing modes can be advantageously suppressed, so that rotational rate sensor 1 according to the present invention can achieve a high degree of measurement precision.

Figure 8:
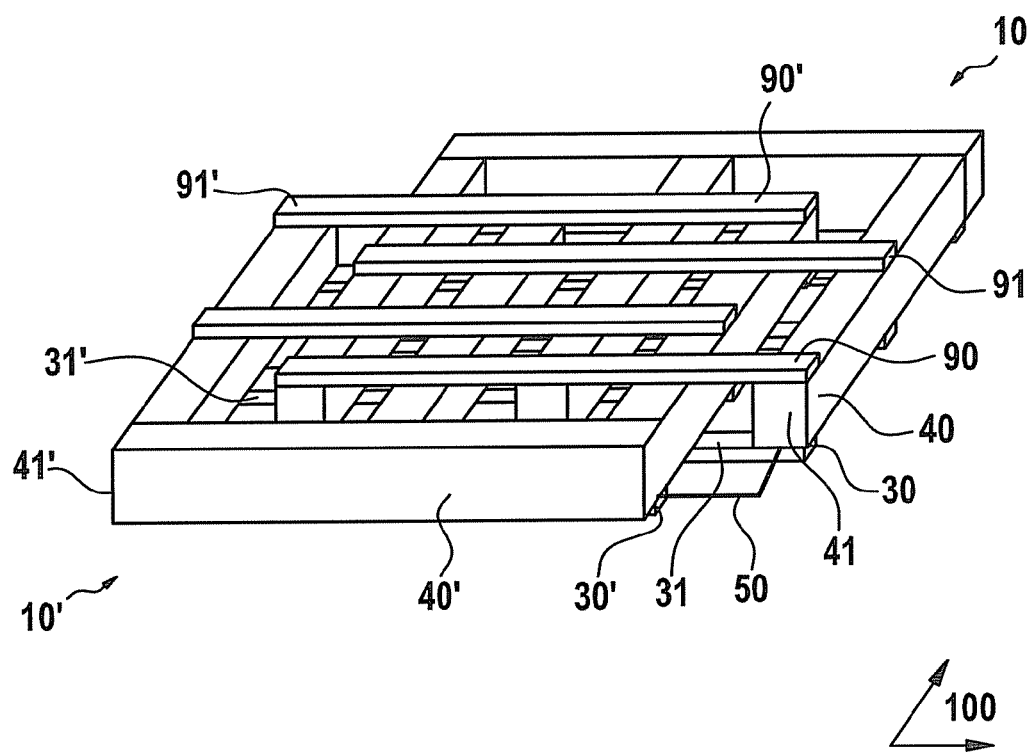
FIG. 8 shows a perspective representation of a first and of a second Coriolis element in an interleaved configuration according to a seventh specific embodiment of the present invention.

FIG. 8 shows a perspective view of a first and of a second Coriolis element 10, 10' in an interleaved configuration according to a seventh specific embodiment of the present invention, the seventh specific embodiment resembling the second specific embodiment described in FIG. 2, the first and second layer construction of first and second Coriolis element 10, 10' having a fifth functional plane 90 extending essentially parallel to main plane of extension 100 and having a sixth functional plane 90' extending essentially parallel to main plane of extension 100, the fifth functional plane 90 and sixth functional plane 90' having a fifth partial lattice structure and a sixth partial lattice structure, the fifth partial lattice structure having fifth webs 91 situated essentially parallel to a fifth partial lattice direction, the fifth partial lattice direction running essentially perpendicular to the second partial lattice direction. Analogously, the sixth partial lattice structure includes sixth webs 91' situated essentially parallel to a sixth partial lattice direction, the sixth partial lattice direction running essentially perpendicular to the fourth partial lattice direction. Advantageously, with this system it is possible to realize a particularly robust first and second lattice structure of first and second Coriolis elements 10, 10' and to increase the bending rigidity along a direction running perpendicular to main plane of extension 100.

What is claimed is:

1. A rotational rate sensor, comprising:
a substrate having a main plane of extension;
a first Coriolis element; and
a second Coriolis element;
wherein:
the first Coriolis element and the second Coriolis element are configured to be driven along a drive direction;
a first deflection of the first Coriolis element along a detection direction which runs perpendicular to the drive direction is detectable;
a second deflection of the second Coriolis element along the detection direction is detectable;
the first Coriolis element has a first center of gravity and the second Coriolis element has a second center of gravity;
the first Coriolis element has a first extension along the drive direction, a second extension along the detection direction, and a third extension along a third direction running perpendicular to the drive direction and perpendicular to the detection direction;
the second Coriolis element has a fourth extension along the drive direction, a fifth extension along the detection direction, and a sixth extension along the third direction;
in the idle state of the rotational rate sensor, (i) the distance between the first center of gravity and the second center of gravity along the drive direction is less than 30% of the first extension and less than 30% of the fourth extension, and (ii) the distance between the first center of gravity and the second center of gravity along the detection direction is less than 30% of the second extension and less than 30% of the fifth extension, and (iii) the distance between the first center of gravity and the second center of gravity along the third direction is less than 30% of the third extension and less than 30% of the sixth extension.

2. The rotational rate sensor as recited in claim 1, wherein in the idle state of the rotational rate sensor, at least one of: (i) the distance between the first center of gravity and the second center of gravity along the drive direction is less than 10% of the first extension and less than 10% of the fourth extension; and (ii) the distance between the first center of gravity and the second center of gravity along the direction of detection is less than 10% of the second extension and less than 10% of the fifth extension; and (iii) the distance between the first center of gravity and the second center of gravity along the third direction is less than 10% of the third extension and less than 10% of the sixth extension.

3. The rotational rate sensor as recited in claim 1, wherein the first Coriolis element has a first lattice structure and the second Coriolis element has a second lattice structure, and wherein the first lattice structure and the second lattice structure are configured to intermesh with one another.

4. The rotational rate sensor as recited in claim 1, wherein the first Coriolis element and the second Coriolis element each have a layer construction including a first functional plane and at least one second functional plane, and wherein the first functional plane and the second functional plane extend essentially parallel to the main plane of extension and are situated one over the other along a direction running perpendicular to the main plane of extension, and wherein the first functional plane has a first partial lattice structure having first webs situated parallel to a first partial lattice direction, the second functional plane has a second partial lattice structure having second webs situated parallel to a second partial lattice direction, and wherein the first partial lattice direction extends perpendicular to the second partial lattice direction.

5. The rotational rate sensor as recited in claim 4, wherein the layer construction includes a third functional plane extending essentially parallel to the main plane of extension and situated over the second functional plane along the direction running perpendicular to the main plane of extension, and wherein the third functional plane has a third partial lattice structure having third webs situated parallel to a third partial lattice direction running perpendicular to the second partial lattice direction.

6. The rotational rate sensor as recited in claim 2, wherein the first Coriolis element and the second Coriolis element are essentially identical to one another.

7. The rotational rate sensor as recited in claim 1, wherein the first Coriolis element is configured to be selectively driven to a first drive vibration along the drive direction, and wherein the second Coriolis element is configured to be selectively driven to a second drive vibration along the drive direction, the first drive vibration being out of phase with the second drive vibration.

8. The rotational rate sensor as recited in claim 1, wherein the first and second Coriolis elements are connected to one another by at least one coupling element having a rocker structure, and wherein the coupling element is anchored to the substrate via at least one anchoring spring configured as one of a flexible spring or a portion spring.

9. The rotational rate sensor as recited in claim 1, wherein at least one of: (i) the first Coriolis element includes a first drive frame and a first detection element, the first detection element being connected to the first drive frame by at least one first spring element configured to be soft along the drive direction and rigid along the detection direction; and (ii) the second Coriolis element includes a second drive frame and a second detection element, the second detection element being connected to the second drive frame by at least one second spring element configured to be soft along the drive direction and rigid along the detection direction.

10. The rotational rate sensor as recited in claim 1, wherein the first Coriolis element and the second Coriolis element are galvanically separate from one another and form an electrical capacitance.

* * * * *